US008093767B2

(12) United States Patent
Pepin et al.

(10) Patent No.: US 8,093,767 B2
(45) Date of Patent: Jan. 10, 2012

(54) LINEAR-RESONANT VIBRATION MODULE

(76) Inventors: Brian Marc Pepin, Oakland, CA (US);
Robin Elenga, Seattle, WA (US)

( * ) Notice: Subject to any disclaimer, the term of this patent is extended or adjusted under 35 U.S.C. 154(b) by 0 days.

(21) Appl. No.: 12/782,697

(22) Filed: May 18, 2010

(65) Prior Publication Data

US 2010/0289346 A1    Nov. 18, 2010

Related U.S. Application Data

(60) Provisional application No. 61/179,109, filed on May 18, 2009.

(51) Int. Cl.
*H02K 33/00* (2006.01)
*H02K 41/02* (2006.01)
*H02K 41/00* (2006.01)
*H02K 7/00* (2006.01)

(52) U.S. Cl. ........... 310/15; 310/12.15; 310/13; 310/14; 310/19

(58) Field of Classification Search ............... 310/13–15, 310/19, 12.15
See application file for complete search history.

(56) References Cited

U.S. PATENT DOCUMENTS

| | | | | |
|---|---|---|---|---|
| 5,955,799 A * | 9/1999 | Amaya et al. | ................... | 310/36 |
| 6,323,568 B1 * | 11/2001 | Zabar | ............................. | 310/17 |
| 6,326,706 B1 * | 12/2001 | Zhang | ......................... | 310/12.31 |
| 6,809,427 B2 * | 10/2004 | Cheung et al. | ................ | 290/1 R |
| 2005/0231045 A1 * | 10/2005 | Oba et al. | ......................... | 310/19 |
| 2005/0275508 A1 * | 12/2005 | Orr et al. | .................... | 340/407.1 |
| 2006/0138875 A1 * | 6/2006 | Kim et al. | ........................ | 310/15 |
| 2006/0208600 A1 * | 9/2006 | Sahyoun | ....................... | 310/254 |
| 2008/0174187 A1 * | 7/2008 | Erixon et al. | ................... | 310/15 |

FOREIGN PATENT DOCUMENTS

| | | |
|---|---|---|
| JP | 10164809 A | 6/1998 |
| JP | 11018395 A | 1/1999 |
| WO | 9819383 A1 | 5/1998 |

* cited by examiner

*Primary Examiner* — Quyen Leung
*Assistant Examiner* — Jose Gonzalez Quinones
(74) *Attorney, Agent, or Firm* — Olympic Patent Works PLLC.

(57) ABSTRACT

Various embodiments of the present invention comprise linear-resonant vibration modules that can be incorporated in a wide variety of appliances, devices, and systems to provide vibrational forces. The vibrational forces are produced by linear oscillation of a weight or member, in turn produced by rapidly alternating the polarity of one or more driving electromagnets. Feedback control is used to maintain the vibrational frequency of linear-resonant vibration module at or near the resonant frequency for the linear-resonant vibration module. Linear-resonant vibration modules can be designed to produce vibrational amplitude/frequency combinations throughout a large region of amplitude/frequency space.

5 Claims, 15 Drawing Sheets

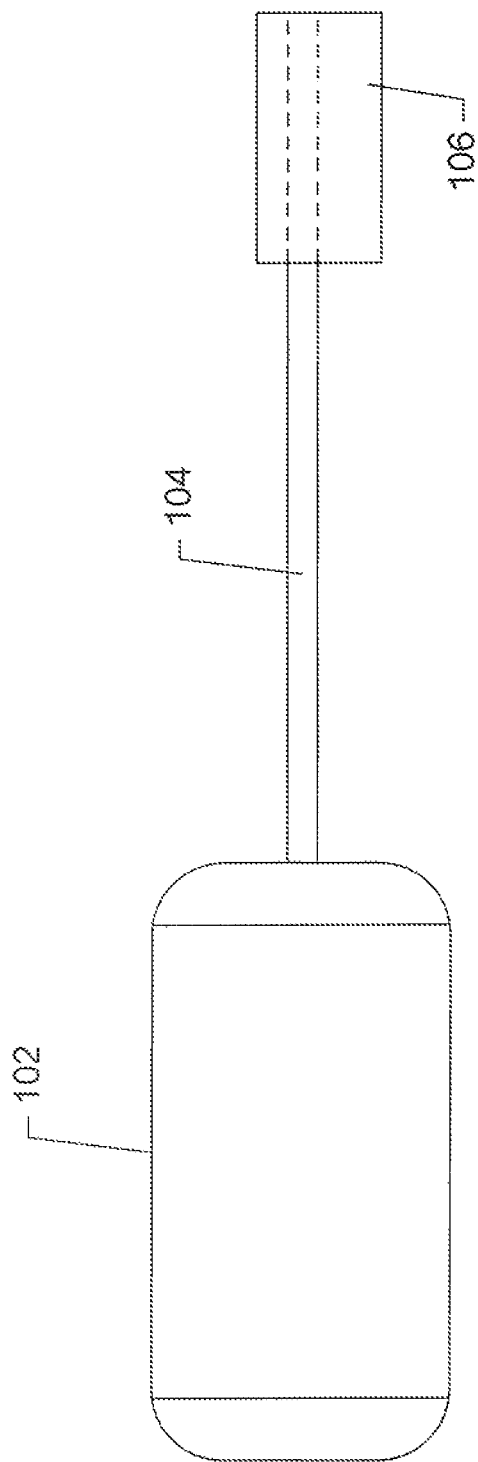
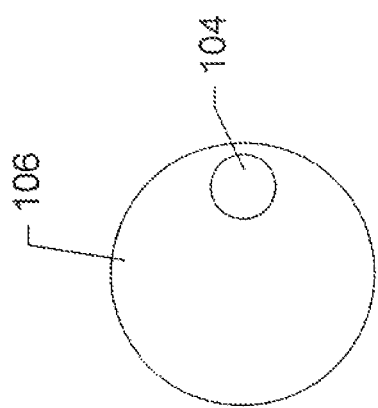
FIGURE 1A
—Prior Art—
FIGURE 1B
—Prior Art—

LINEAR-RESONANT VIBRATION MODULE

CROSS-REFERENCE TO RELATED APPLICATION

This application claims the benefit of Provisional Patent Application No. 61/179,109, filed May 18, 2009.

TECHNICAL FIELD

The present invention is related to vibration-generating devices and, in particular, to vibration modules that can be incorporated into a wide variety of different types of electromechanical devices and systems to produce vibrations of selected amplitudes and frequencies over a wide range amplitude/frequency space.

BACKGROUND

Vibration-inducing motors and mechanisms have been used for many years in a wide variety of different consumer appliances, toys, and other devices and systems. Examples include vibration signals generated by pagers, vibration-driven appliances, such as hair-trimming appliances, electric toothbrushes, electric toy football games, and many other appliances, devices, and systems. The most common electromechanical system used for generating vibrations is an intentionally unbalanced electric motor.

FIGS. 1A-B illustrate an unbalanced electric motor typically used liar generating vibrations in a wide variety of different devices. As shown in FIG. 1A, a small, relatively low-power electric motor 102 rotates a cylindrical shaft 104 onto which a weight 106 is asymmetrically or mounted. FIG. 1B shows the weight asymmetrically mounted to the shaft, looking down at the weight and shaft in the direction of the axis of the shall. As shown in FIG. 1B, the weight 106 is mounted off-center on the electric-motor shaft 104. FIGS. 2A-13 illustrate the vibrational motion produced by the unbalanced electric motor shown in FIGS. 1A-B. As shown in FIGS. 2A-B, the asymmetrically-mounted weight creates an elliptical oscillation of the end of the shall, normal to the shaft axis, when the shall is rotated at relatively high speed by the electric motor. FIG. 2A shows displacement of the weight and shall from the stationary shall axis as the shall is rotated, looking down on the weight and shaft along the shall axis, as in FIG. 1B. In FIG. 2A, a small mark 202 is provided at the periphery of the disk-shaped end the of electric-motor shall to illustrate rotation of the shaft. When the shalt rotates at high speed, a point 204 on the edge of the weight traces an ellipsoid 206 and the center of the shaft 208 traces a narrower and smaller ellipsoid 210. Were the shaft balanced, the center of the shaft would remain at a position 212 in the center of the diagram during rotation, but the presence of the asymmetrically-mounted weight attached to the shaft, as well as other geometric and weight-distribution characteristics of the electric motor, shall, and unbalanced weight together create forces that move the end of the shaft along the elliptical path 210 when the shaft is rotated at relatively high speed. The movement can be characterized, as shown in FIG. 2B, by a major axis 220 and minor axis 222 of vibration, with the direction of the major axis of vibration equal to the direction of the major axis of the ellipsoids, shown in FIG. 2A, and the length of the major axis corresponding to the amplitude of vibration in this direction. In many applications, in which a linear oscillation is desired, designers seek to force the major-axis-amplitude/minor-axis-amplitude ratio to be as large as possible, but, because the vibration is produced by a rotational force, it is generally not possible to achieve linear oscillation. In many cases, time path traced by the shall center may be close to circular. The frequency of vibration of the unbalanced electric motor is equal to the rotational frequency of the electric-motor shaft, and is therefore constrained by the rate at which the motor can rotate the shaft. At low rotational speeds, little vibration is produced.

While effective in producing vibrations, there are many problems associated with the unbalanced-electric-motor vibration-generating units, such as that shown in FIG. 1A, commonly used in the various devices, systems, and applications discussed above. First, unbalancing the shaft of an electric motor not only produces useful vibrations that can be harnessed for various applications, but also produces destructive, unbalanced forces within the motor that contribute to rapid deterioration of motor parts. Enormous care and effort is undertaken to precisely balance rotating parts of motors, vehicles, and other types of machinery, and the consequences of unbalanced rotating parts are well known to anyone familiar with automobiles, machine tools, and other such devices and systems. The useful lifetimes of many devices and appliances, particularly hand-held devices and appliances, that employ unbalanced electric motors for generating vibrations may range from a few tens of hours to a few thousands of hours of use, after which the vibrational amplitude produced by the devices declines precipitously as the electric motor and other parts deteriorate.

A second problem with unbalanced electric motors is that they are relatively inefficient at producing vibrational motion. A far greater amount of power is consumed by an unbalanced electrical motor to produce a given vibrational force than the theoretical minimum power required to produce the given vibrational three. As a result, many hand-held devices that employ unbalanced electric motors the generating vibrations quickly consume batteries during use.

A third problem with unbalanced electric motors, discussed above, is that they generally produce elliptical vibrational modes. Although such modes may be useful in particular applications, many applications can better use a linear oscillation, with greater directional concentration of vibrational forces. Linear oscillation cannot generally be produced by unbalanced electric motors.

A fourth, and perhaps most fundamental, problem associated with using unbalanced electric motors to generate vibrations is that only a very limited portion of the total vibrational-force/frequency space is accessible to unbalanced electric motors. FIG. 3 shows a graph of vibrational three with respect to frequency for various types of unbalanced electric motors. The graph is shown as a continuous hypothetical curve, although, of course, actual data would be discrete. As shown in FIG. 3, for relatively low-power electric motors used in hand-held appliances, only a fairly narrow range of frequencies centered about 80 Hz (302 in FIG. 3) generate a significant vibrational force. Moreover, the vibrational force is relatively modest. The bulk of energy consumed by an unbalanced electric motor is used to spin the shaft and unbalanced weight and to overcome frictional and inertial threes within the motor. Only a relatively small portion of the consumed energy is translated into desired vibrational forces.

Because of the above-discussed disadvantages with the commonly employed unbalanced-electric-motor vibration-generation units, designers, manufacturers, and, ultimately, users of a wide variety of different vibration-based devices, appliances, and systems continue to seek more efficient and capable vibration-generating units for incorporation into many consumer appliances, devices, and systems.

SUMMARY

Various embodiments of the present invention comprise linear-resonant vibration modules that can be incorporated in a wide variety of appliances, devices, and systems to provide vibrational forces. The vibrational forces are produced by linear oscillation of a weight or member, in turn produced by rapidly alternating the polarity of one or more driving electromagnets. Feedback control is used to maintain the vibrational frequency of linear-resonant vibration module at or near the resonant frequency for the linear-resonant vibration module. Linear-resonant vibration modules can be designed to produce vibrational amplitude/frequency combinations throughout a large region of amplitude/frequency space.

BRIEF DESCRIPTION OF THE DRAWINGS

FIGS. 1A-B illustrate an unbalanced electric motor typically used for generating vibrations in a wide variety of different devices.

DETAILED DESCRIPTION

Figure 2A:
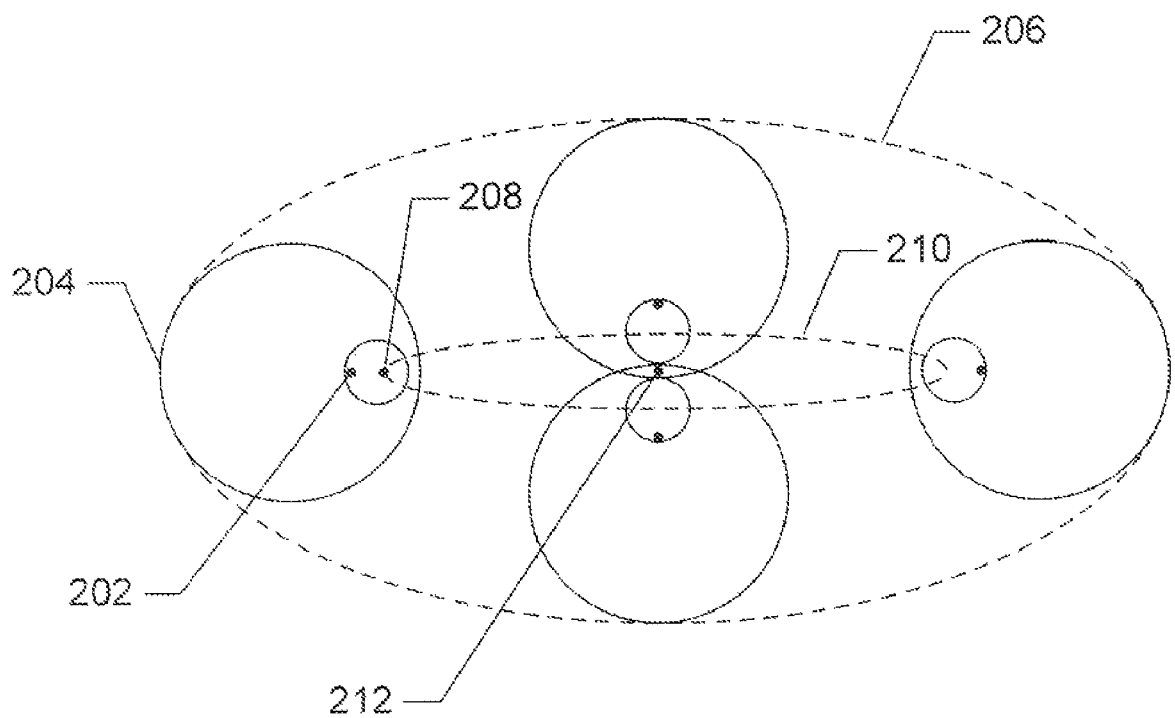
FIGS. 2A-B illustrate the vibrational motion produced by the unbalanced electric motor shown in FIGS. 1A-B.
Figure 2B:
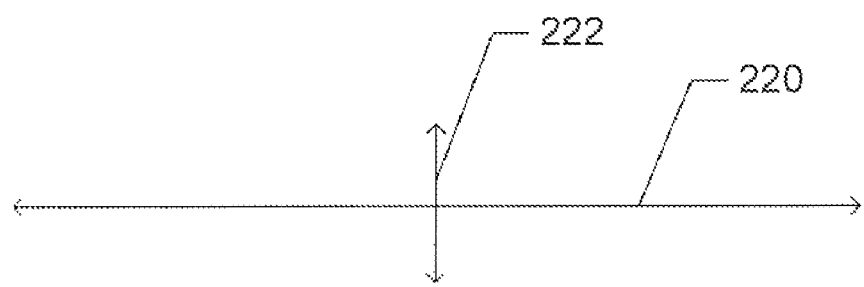

Embodiments of the present invention include various types of linear-resonant vibration modules ("LRVMs") that can be used within a wide variety of different types of appliances, devices, and systems, to generate vibrational forces. The LRVMs that represent embodiments of the present invention are linear in the sense that the vibrational forces are produced by a linear oscillation of a weight or component within the LRVM, rather than as a by-product of an unbalanced rotation, as in the case of currently employed unbalanced electric motors. The linear nature of the LRVM vibration-inducing motion allows the problems associated with unbalanced-electric-motor vibrators, discussed above, to be effectively addressed. An oscillating linear motion does not produce destructive forces that quickly degrade and wear out an unbalanced electric motor. A linearly oscillating mechanism is characterized by parameters that can be straightforwardly varied in order to produce vibrations of a desired amplitude and frequency over a very broad region of amplitude/frequency space. Combining a linearly oscillating vibration-inducing mechanism with feedback control, so that the frequency of vibration falls close to the resonant frequency of the LRVM, results in optimal power consumption with respect to the amplitude and frequency of vibration produced by the LRVM. Clearly, linear oscillation within a LRVM translates into highly direction vibrational forces produced by an appliance or device that incorporates the LRVM.

FIGS. 4A-G illustrate one particular LRVM, and operation of the particular LRVM, that represents one embodiment of the present invention. FIGS. 4A-G all use the same illustration conventions, next discussed with reference to FIG. 4A. The LRVM includes a cylindrical housing 402 within which a solid, cylindrical mass 404, or weight, can move linearly along the inner, hollow, cylindrically shaped chamber 406 within the cylindrical housing or tube 402. The weight is a magnet, in the described embodiment of the present invention, with polarity indicated by the "+" sign 410 on the right-hand end and the "−" sign 412 on the left-hand end of the weight 404. The cylindrical chamber 406 is capped by two magnetic disks 414 and 416 with polarities indicated by the "+" sign 418 and the "−" sign 419. The disk-like magnets 414 and 418 are magnetically oriented opposite from the magnetic orientation of the weight 404, so that when the weight moves to either the extreme left or extreme right sides of the cylindrical chamber, the weight is repelled by one of the disk-like magnets at the left or right ends of the cylindrical chamber. In other words, the disk-like magnets act much like springs, to facilitate deceleration and reversal of direction of motion of the weight and to minimize or prevent mechanical-impact forces of the weight and the end caps that close off the cylindrical chamber. Finally, a coil of conductive wire 420 girdles the cylindrical housing, or tube 402 at approximately the mid-point of the cylindrical housing.

Figure 4A:
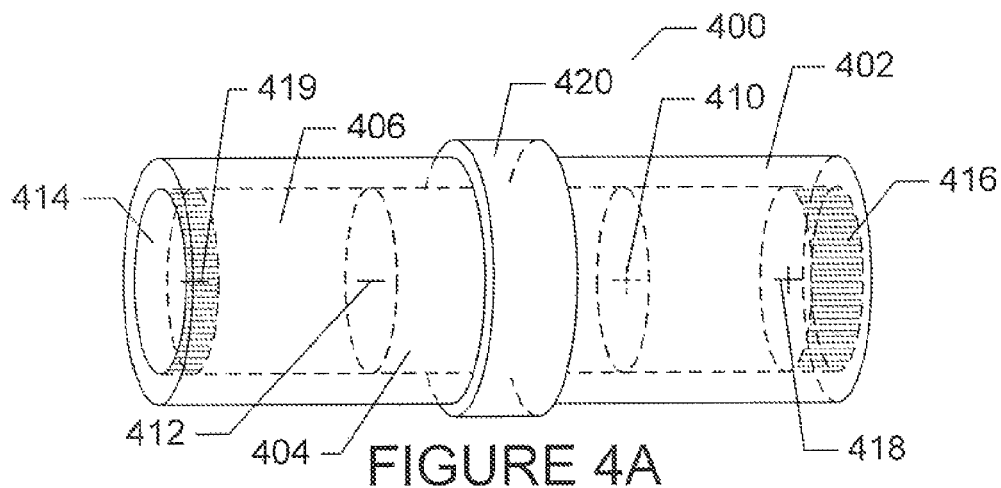
FIGS. 4A-G illustrate one particular LRVM, and operation of the particular LRVM, that represents one embodiment of the present invention.
Figure 4B:
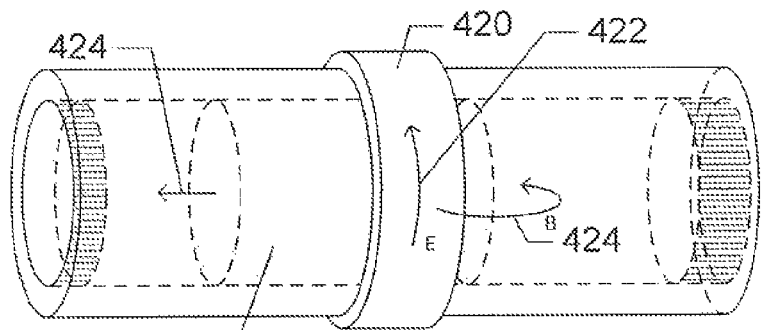
Figure 4C:
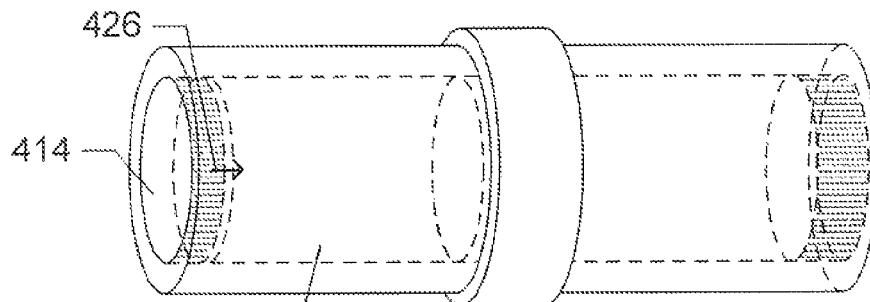
Figure 4D:
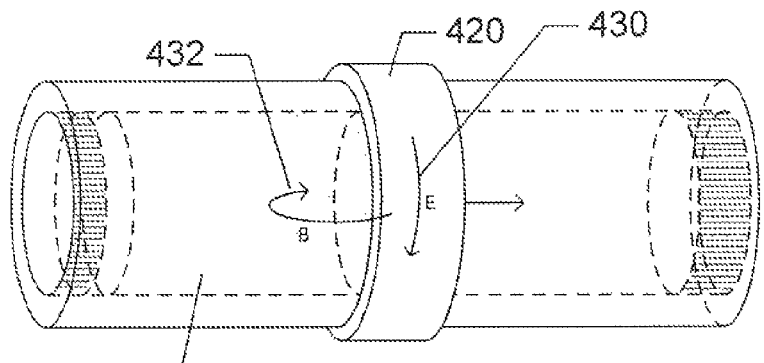
Figure 4E:
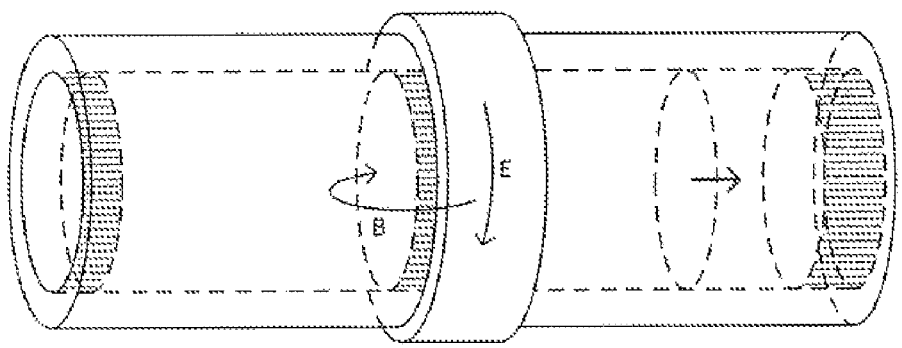
Figure 4F:
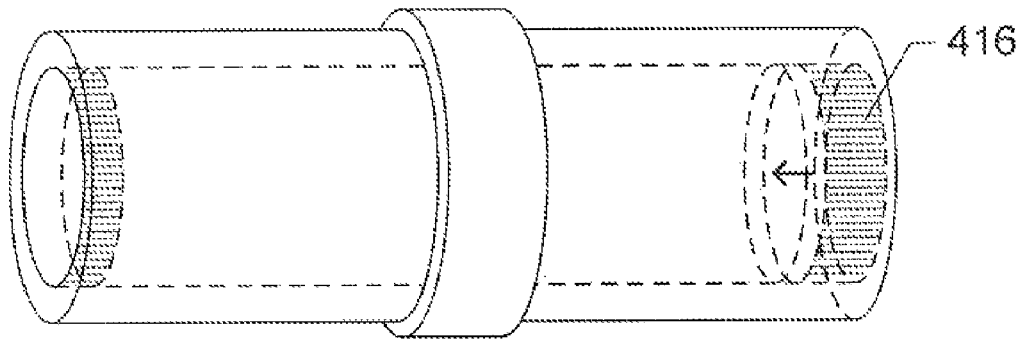
Figure 4G:
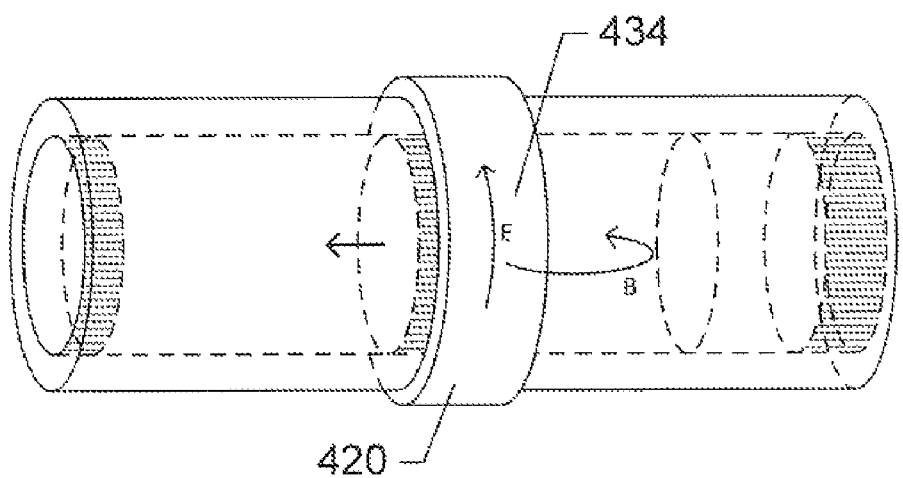

FIGS. 4B-G illustrate operation of the LRVM shown in FIG. 4A. When an electric current is applied to the coil 420 in a first direction 422, a corresponding magnetic force 424 is generated in a direction parallel to the axis of the cylindrical chamber, which accelerates the weight 404 in the direction of the magnetic force 424. When the weight reaches a point at or close to the corresponding disk-like magnet 414, as shown in FIG. 4C, a magnetic force due to the repulsion of the disk-like magnet 414 and the weight 404, 426, is generated in the opposite direction, decelerating the weight and reversing its direction. As the weight reverses direction, as shown in FIG. 4D, current is applied in an opposite direction 430 to the coil 420, producing a magnetic force 432 in an opposite direction from the direction of the magnetic. force shown in FIG. 4B, which accelerates the weight 404 in a direction opposite to the direction in which the weight is accelerated in FIG. 4B. As shown in FIG. 4E, the weight then moves rightward until, as shown in FIG. 4F, the weight is decelerated, stopped, and then accelerated in the opposite direction by repulsion of the disk-like magnet 416. An electrical current is then applied to the coil 420 in the same direction 434 as in FIG. 4B, again accelerating the solid cylindrical mass in the same direction as in FIG. 4B. Thus, by a combination of a magnetic field with rapidly reversing polarity, generated by alternating the direction of current applied to the coil, and by the repulsive forces between the weight magnet and the disk-like magnets at each end of the hollow, cylindrical chamber, the weight linearly oscillates back and forth within the cylindrical housing 402, imparting a direction force at the ends of the cylindrical chamber with each reversal in direction.

Clearly, the amplitude of the vibration and vibrational forces produced are related to the length of the hollow chamber in which the weight oscillates, the current applied to the coil, the mass of the weight, the acceleration of the weight produced by the coil, and the mass of the entire LRVM. All of these parameters are essentially design parameters for the LRVM, and thus the LRVM can be designed to produce a wide variety of different amplitudes.

Figure 5B:
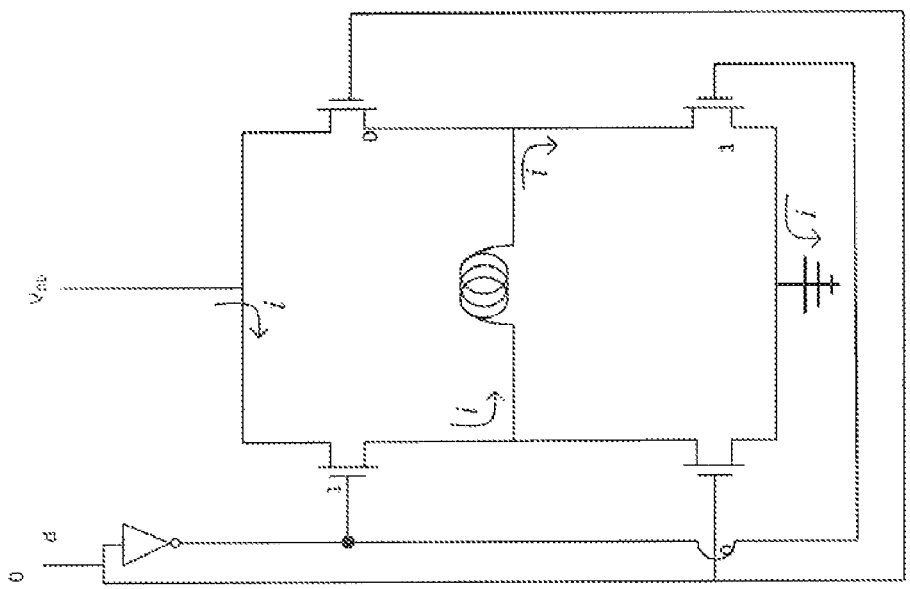
FIGS. 5A-B illustrate an H-bridge switch that can be used, in various embodiments of the present invention, to change the direction of current applied to the coil that drives linear oscillation within a linear-resonance vibration module ("LRVM").
Figure 5A:
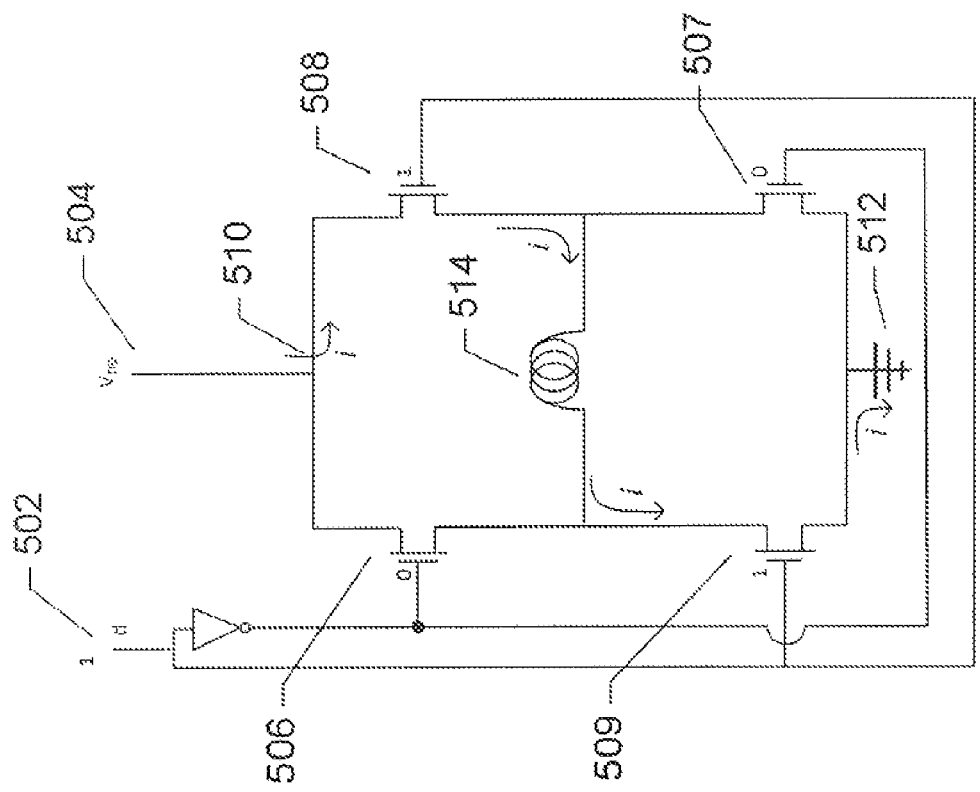

The frequency of the oscillation of the solid, cylindrical mass is determined by the frequency at which the direction of the current applied to the coil is changed. FIGS. 5A-B illustrate an H-bridge switch that can be used, in various embodiments of the present invention, to change the direction of current applied to the coil that drives linear oscillation within an LRVM. FIGS. 5A-B both use the same illustration conventions, described next with respect to FIG. 5A. The H-bridge switch receives, as input, a directional signal d 502 and direct-current ("DC") power 504. The direction-control signal d 502 controls four switches 506-509, shown as transistors in FIG. 5A. When the input control signal d 502 is high, or "1," as shown in FIG. 5A, switches 508 and 509 are closed and switches 506 and 507 are open, and therefore current flows, as indicated by curved arrows, such as curved arrow 510, from the power-source input 504 to ground 512 in a leftward direction through the coil 514. When the input-control signal d is low, or "0," as shown in FIG. 5B, the direction of the current through the coil is reversed. The H-bridge switch, shown in FIGS. 5A-B, is but one example of various different types of electrical and electromechanical switches that can be used to rapidly alternate the direction of current within the coil of an LRVM.

Figure 6:
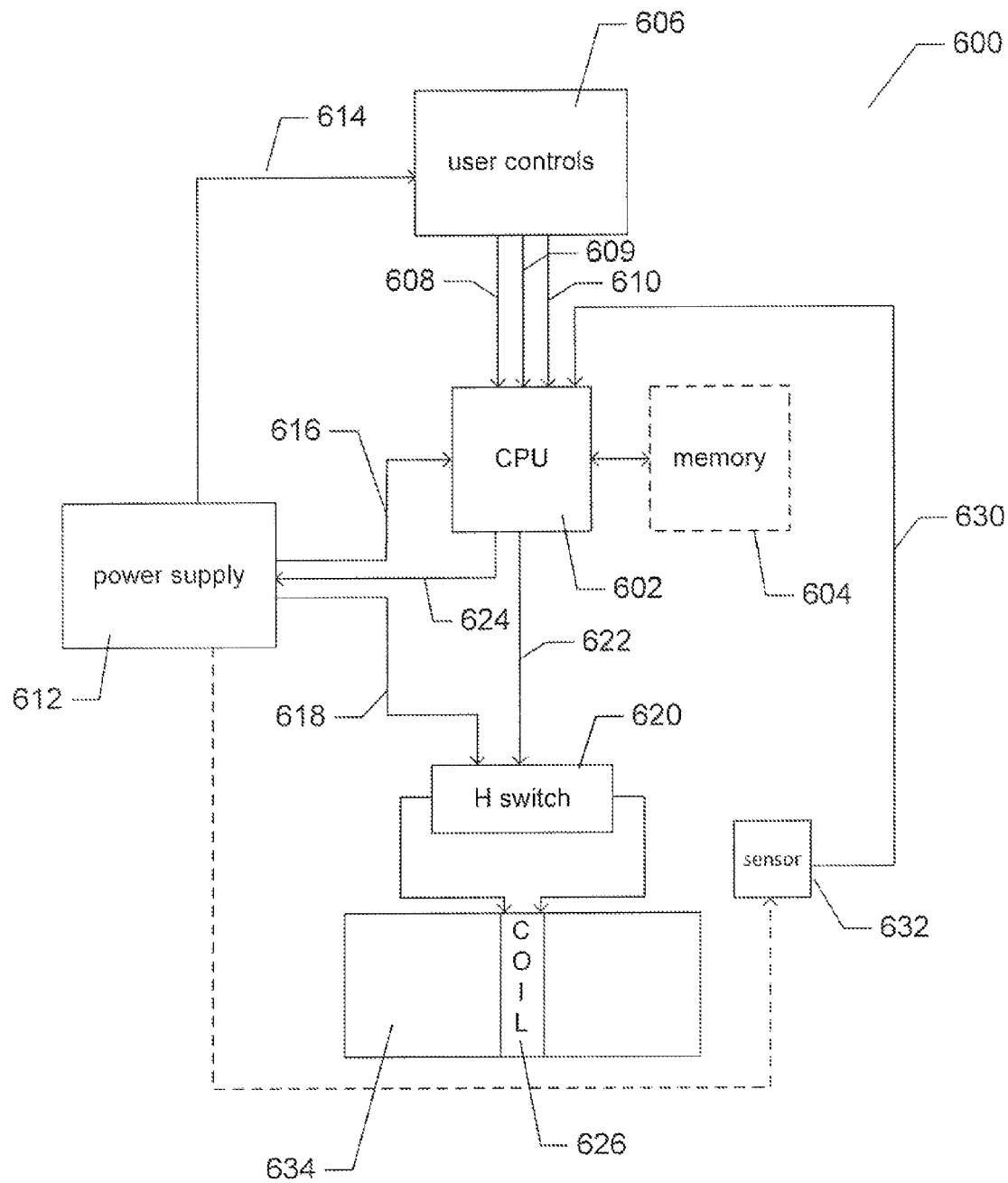
FIG. 6 provides a block diagram of the LRVM, illustrated in FIGS. 4A-G, that represents one embodiment of the present invention.

FIG. 6 provides a block diagram of the LRVM, illustrated in FIGS. 4A-G, that represents one embodiment of the present invention. The LRVM, in addition to the cylindrical housing, coil, and internal components shown in FIG. 4A, includes a power supply, a user interface, generally comprising electromechanical buttons or switches, the H-bridge switch, discussed above with reference to FIGS. 5A-B, a central processing unit ("CPU"), generally a small, low-powered microprocessor, and one or more electromechanical sensors. All of these components are packaged together as an LRVM within a vibration-based appliance, device, or system.

As shown in FIG. 6, the LRVM 600 is controlled by a control program executed by the CPU microprocessor 602. The microprocessor may contain sufficient on-board memory to store the control program and other values needed during execution of the control program, or, alternatively, may be coupled to a low-powered memory chip 604 or flash memory for storing the control program. The CPU receives inputs front the user controls 606 that together comprise a user interface. These controls may include any of various dials, pushbuttons, switches, or other electromechanical-control devices. As one example, the user controls may include a dial to select a strength of vibration, which corresponds to the current applied to the coil, a switch to select one of various different operational modes, and a power button. The user controls generate signals input to the CPU 608-610. A power supply 612 provides power, as needed, to user controls 614, to the CPU 616 and optional, associated memory, to the H-bridge switch 618, and, when needed, to one or more sensors 632. The voltage and current supplied by the power supply to the various components may vary, depending on the operational characteristics and requirements of the components. The H-bridge switch 620 receives a control-signal input d 622 from the CPU. The power supply 612 receives a control input 624 from the CPU to control the current supplied to the H-bridge switch 618 for transfer to the coil 626. The CPU receives input 630 from one or more electromechanical sensors 632 that generate a signal corresponding to the strength of vibration currently being produced by the linearly oscillating mass 634. Sensors may include one or more of accelerometers, piezoelectric devices, pressure-sensing devices, or other types of sensors that can generate signals corresponding to the strength of desired vibrational forces.

Figure 7A:
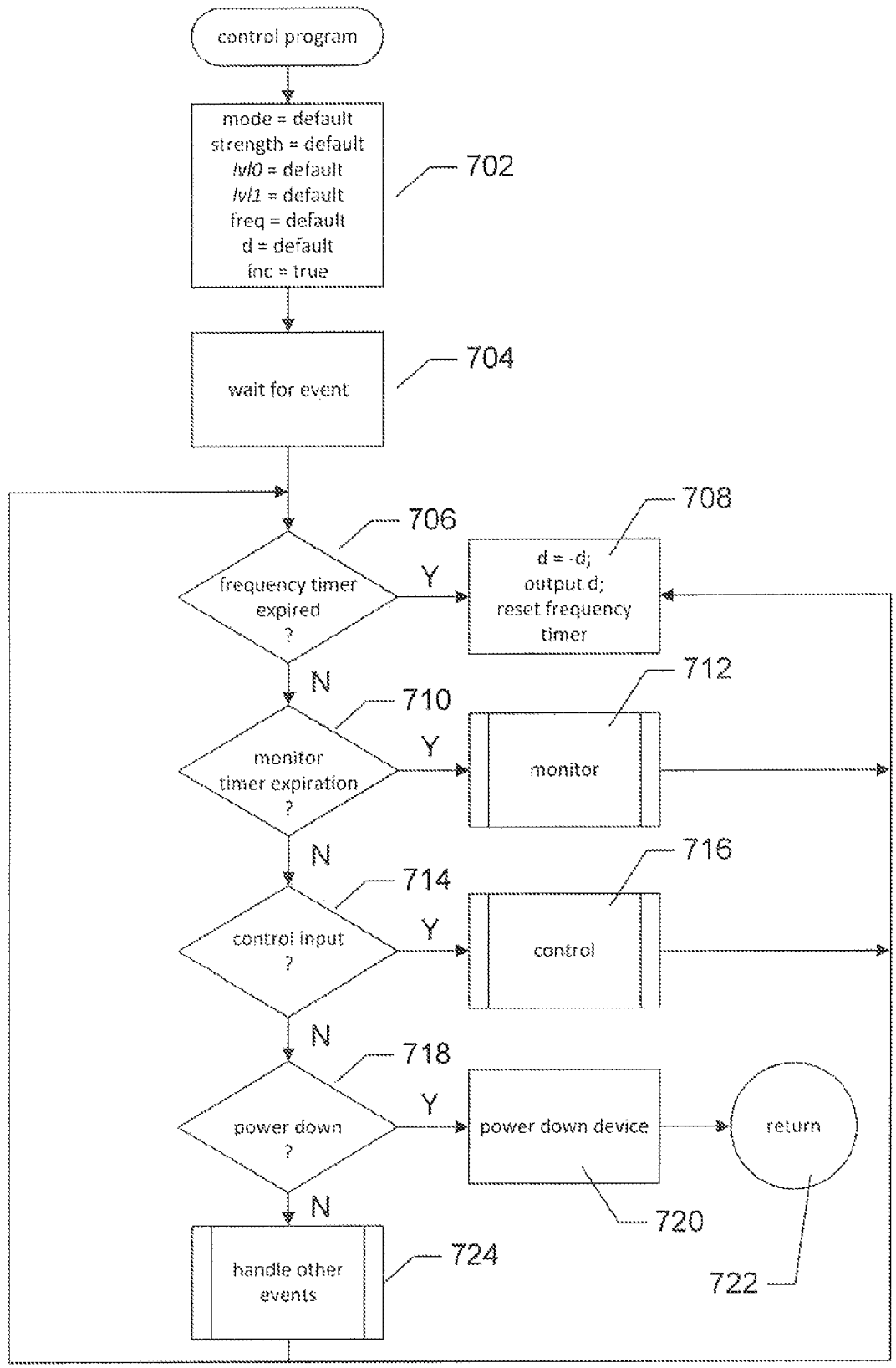
FIGS. 7A-C provide control-flow diagrams that illustrate the control program, executed by the CPU, that controls operation of an LRVM that represents one embodiment of the present invention.
Figure 7B:
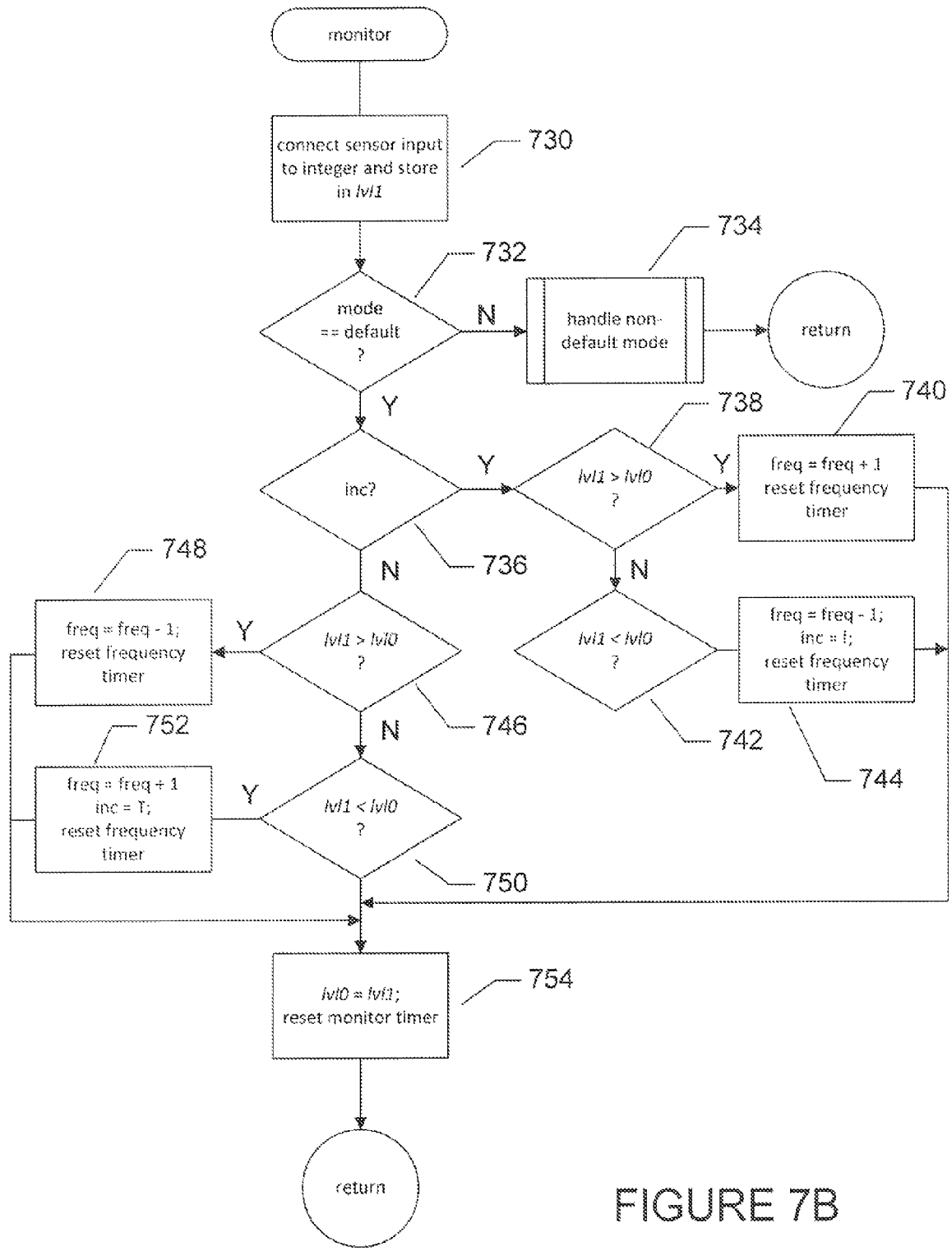
Figure 7C:
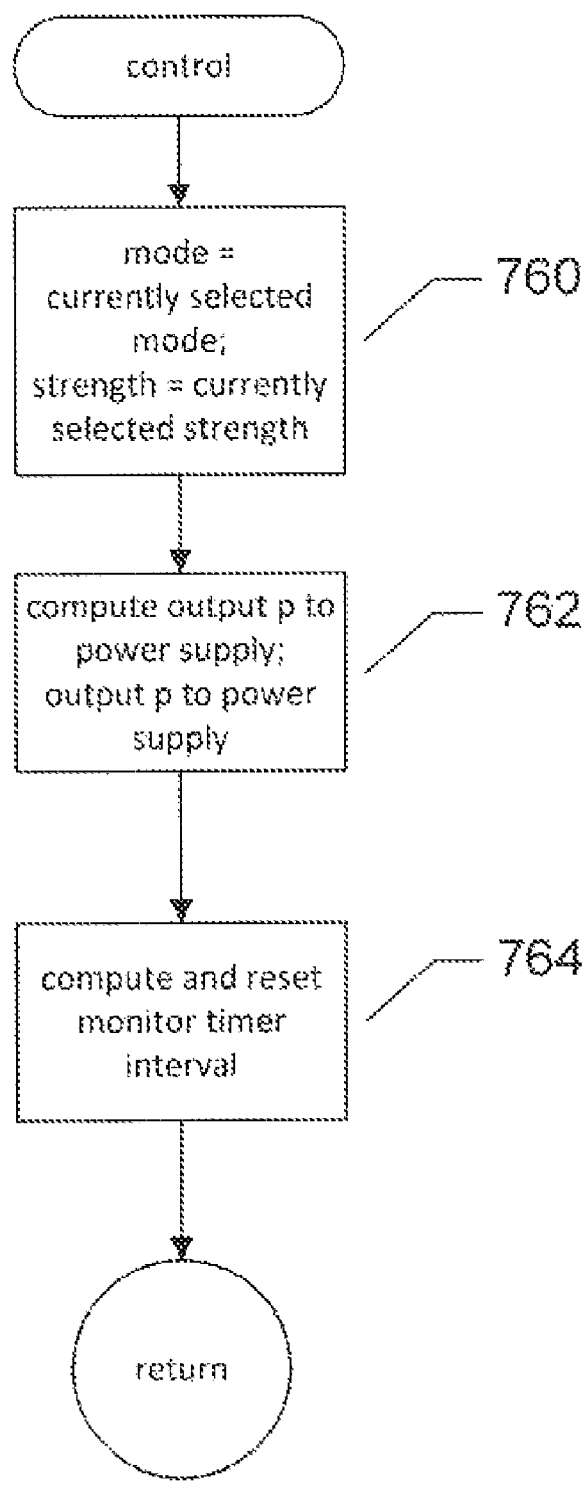

FIGS. 7A-C provide control-flow diagrams that illustrate the control program, executed by the CPU, that controls operation of an LRVM that represents one embodiment of the present invention. FIG. 7A provides a control-Bow diagram for the high-level control program. The program begins execution, in step 702, upon a power-on event invoked by a user through a power button or other user control. In step 702, various local variables are set to default values, including the variables: (1) mode, which indicates the current operational mode of the device; (2) strength, a numerical value corresponding to the current user-selected strength of operation, corresponding to the electrical current applied to the coil; (3) lvl0, a previously sensed vibrational strength; (4) lvl1, a currently sensed vibrational strength; (5) freq, the current frequency at which the direction of current is alternated in the coil; (6) d, the control output to the H-bridge switch; and (7) inc, a Boolean value that indicates that the frequency is currently being increased. Next, in step 704, the control program waits for a next event. The remaining steps represent a continuously executing loop, or event handler, in which each event that occurs is appropriately handled by the control program. In certain implementations of the control program, events may be initiated by interrupt-like mechanisms and stacked for execution while, in more primitive implementations, certain events that overlap in time may be ignored or dropped. In the implementation illustrated in FIGS. 7A-C, two timers are used, one for controlling the change in direction of the current applied to the coil, at a currently established frequency, and the other for controlling a monitoring interval at which the control program monitors the vibrational force currently produced. Rather than using a formal timer mechanism, certain implementations may simply employ counted loops or other simple programming techniques for periodically carrying out tasks. When an event occurs, the control program begins a series of tasks, the first of which is represented by the conditional step 706, to determine what event has occurred and appropriately handle that event. When the frequency timer has expired, as determined in step 706, the value of the output signal d is flipped, in step 708, and output to the H-bridge switch, with the frequency timer being reset to trigger a next frequency-related event. The frequency-timer interval is determined by the current value of the variable freq. Otherwise, when the event is a monitor timer expiration event, as determined in step 710, then a routine "monitor" is called in step 712. Otherwise, when the event corresponds to a change in the user input through the user interface, as determined in step 714, the routine "control" is called in step 716. Otherwise, when the event is a power-down event, as determined in step 718, resulting from deactivation of a power button by the user, then the control program appropriately powers down the device, in step 720, and the control program terminates in step 722. Any other of various types of events that may occur are handled by a default event handler 724. These events may include various error conditions that arise during operation of the device.

FIG. 7B provides a control-flow diagram for the routine "monitor," called in step 712 of FIG. 7A. In step 730, the routine "monitor" converts the sensor input to an integer representing the current vibrational force produced by the LRVM and stores the integer value in the variable lvl1. Next, in step 732, the routine "monitor" determines whether or not the LRVM is currently operating in the default mode. In the default mode, the LRVM uses continuous feedback control to optimize the vibrational force produced by the LRVM by continuously seeking to operate the LRVM at a frequency as close as possible to the resonant frequency for the LRVM. Other, more complex operational modes may be handled by various more complex routines, represented by step 734 in FIG. 7B. More complex vibrational modes may systematically and/or periodically alter the frequency or produce various complex, multi-component vibrational modes useful in certain applications, appliances, devices, and systems. These more complex modes are application dependent, and are not further described in the control-flow diagrams. In the case that the operational mode is the default mode, in which the control program seeks to optimize the vibrational force generated by the device, in step 736, the routine "monitor" determines whether the local variable inc is set to TRUE. If so, then the control program is currently increasing the frequency at which the device operates in order to obtain the resonance frequency. When lvl1 is greater than lvl0, as determined in step 738, then the vibrational force has been recently increased by increasing the frequency, and so the routine "monitor" increases the frequency again, in step 740, and correspondingly resets the frequency timer. Otherwise, when lvl1 is less than lvl0, as determined in step 742, then the control program has increased the frequency past the resonance frequency, and therefore, in step 744, the control program decreases the frequency, sets the variable inc to FALSE, and correspondingly resets the frequency timer. In similar fashion, when the variable inc is initially FALSE, as determined in step 736, and when lvl1 is greater than lvl0, as determined in step 746, the routine "monitor" decreases the value stored in the variable freq, in step 748 and resets the frequency timer. Otherwise, when lvl1 is less than lvl0, as determined in step 750, then the routine "monitor" increases the value stored in the variable freq, sets the variable the to TRUE, and resets the frequency timer in step 752. Finally, the value in lvl1 is transferred to lvl0 and the monitor timer is reset, in step 754.

FIG. 7C provides a control-flow diagram for the routine "control," called in step 716 in FIG. 7A. This routine is invoked when a change in the user controls has occurred. In step 760, the variables mode and strength are set to the currently selected mode and vibrational strength, represented by the current states of control features in the user interface. Next, in step 762, the routine "control" computes an output value p corresponding to the currently selected strength, stored in the variable strength, and outputs the value p to the power supply so that the power supply outputs an appropriate current to the coil. Finally, in step 764, the routine "control" computes a new monitor timer interval and resets the monitor timer accordingly.

The control program described with reference to FIGS. 7A-C is one example of many different implementations of the control program that can be carried out, depending on requirements of the LRVM, the parameters and characteristics inherent in a particular LRVM, the types of control inputs received from a particular user interface, the nature of the power supply, and the types of operational modes that are implemented for the LRVM.

Figure 3:
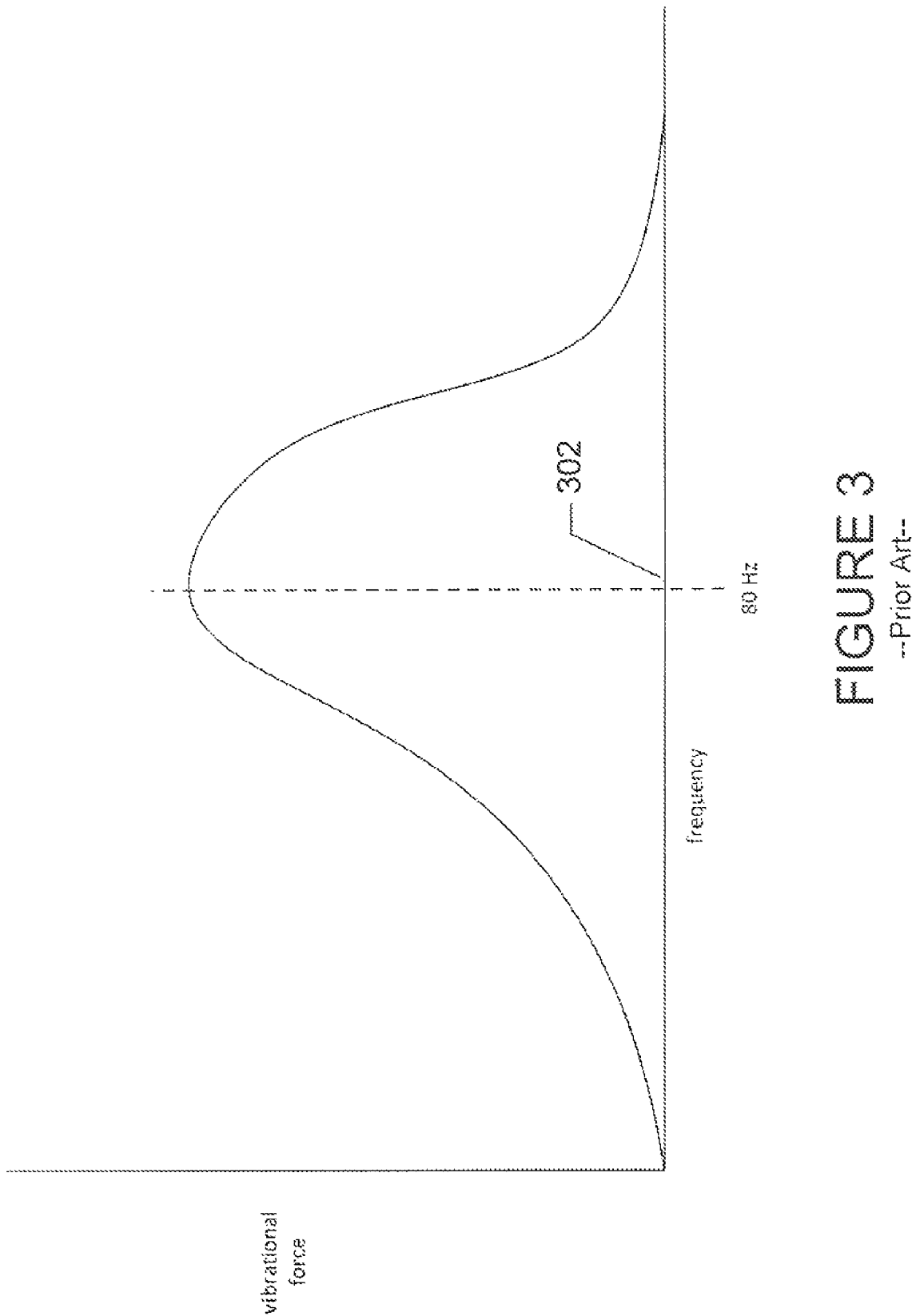
FIG. 3 shows a graph of vibrational force with respect to frequency for various types of unbalanced electric motors.
Figure 8:
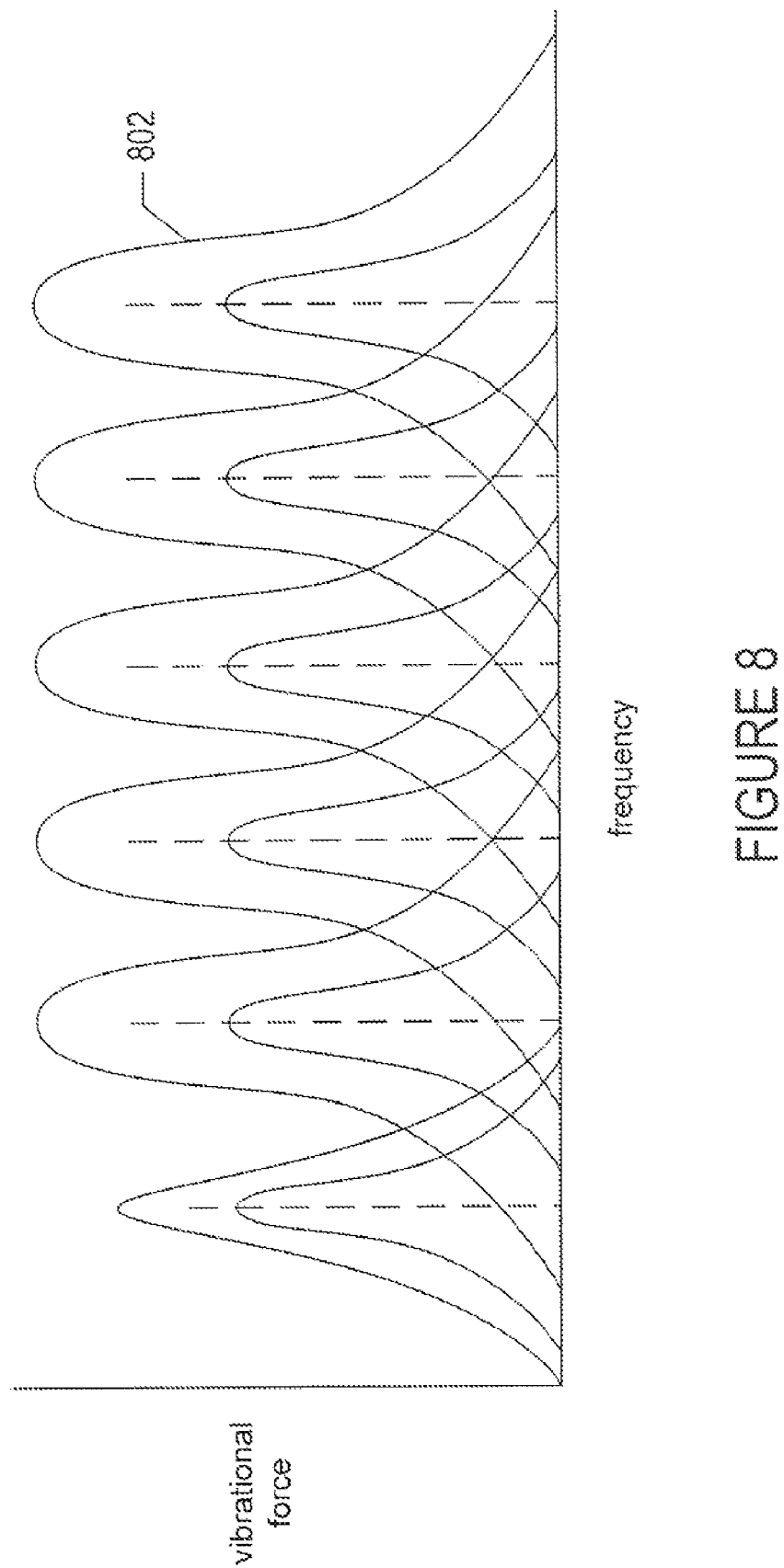
FIG. 8 represents the range of frequencies and vibrational forces that can achieved by different implementations of LRVM and LRVM control programs that represent embodiments of the present invention.
Figure 9:
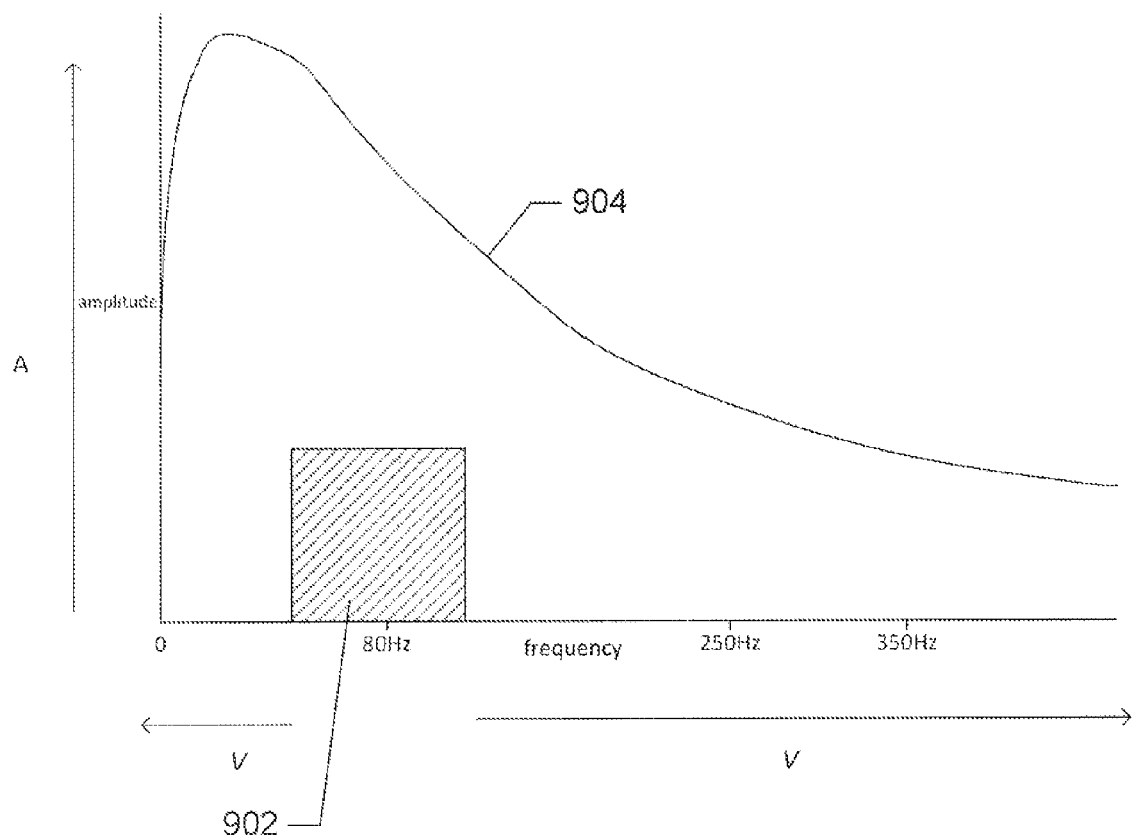
FIG. 9 shows a plot of the amplitude/frequency space and regions in that space that can be operationally achieved by unbalanced electrical motors and by LRVMs that represent embodiments of the present invention.

FIG. 8 represents the range of frequencies and vibrational forces that can be achieved by different implementations of LRVM and LRVM control programs that represent embodiments of the present invention. FIG. 8 has the same axes as the graph shown in FIG. 3. However, unlike FIG. 3, FIG. 8 includes many different curves, such as curve 802, each representing the vibrational forces and frequencies that can be obtained from a particular LRVM implementation. Again, the LRVMs that represent embodiments of the present invention generally have a resonant frequency that is characteristic of the geometry and weights of various components of the LRVM, and each LRVM is naturally operated at a frequency close to this resonant frequency in order to achieve maximum vibrational force. Thus, rather than being restricted, over all possible implementations, to a relatively narrow range of frequencies and vibrational forces, as in the case of unbalanced electrical motors, LRVMs that represent embodiments of the present invention can be designed and implemented to produce desired vibrational forces over a wide range of vibrational frequencies, and desired vibrational frequencies over a wide range of desired vibrational forces. The contrast is perhaps best seen in FIG. 9. FIG. 9 shows a plot of the amplitude/frequency space and regions in that space that can be operationally achieved by unbalanced electrical motors and by LRVMs that represent embodiments of the present invention. Unbalanced electric motors can be implemented to produce amplitude/frequency combinations roughly within the cross-hatched square region 902 within amplitude/frequency space. By contrast, LRVMs can be designed and implemented to produce amplitude/frequency combinations underlying curve 904. Thus, LRVMs can achieve much higher operational frequencies and much lower operational frequencies than can be practically obtained by unbalanced electric motors, and can produce much higher amplitudes and vibrational forces than can be achieved by relatively low-powered unbalanced electrical motors used in hand-held appliances and other commonly encountered devices and systems. Furthermore, when larger vibrational forces are needed, balanced electrical motors are generally impractical or infeasible, due to the destructive forces produced within the electrical motors.

Figure 10:
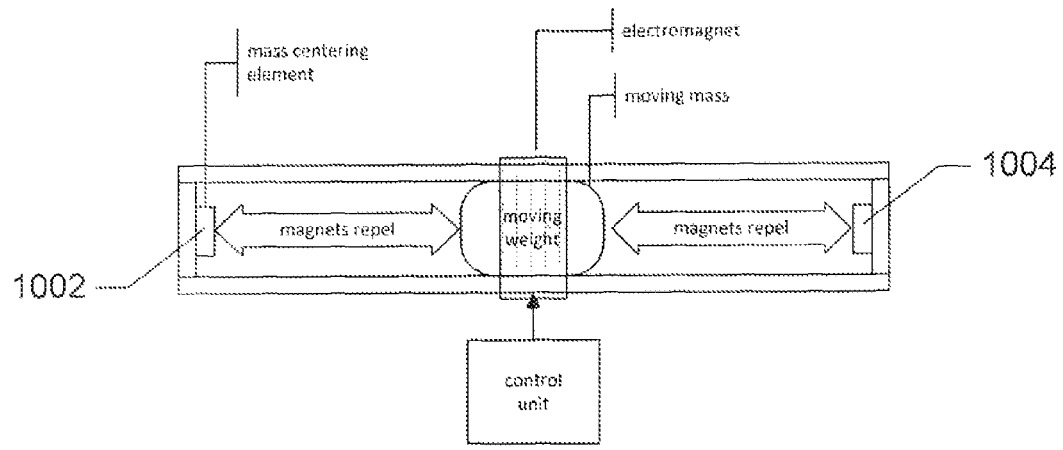
FIGS. 10-17 show a variety of different alternative implementations of LRVMs that represent different embodiments of the present invention.

FIGS. 10-17 show a variety of different alternative implementations of LRVMs that represent different embodiments of the present invention. FIG. 10 provides a schematic illustration of an LVRM similar to that discussed above with reference to FIG. 4A. Note that, in place of the end magnets 1002 and 1004, mechanical springs may alternatively be used. These may be traditional helical springs made from metal or springs made from a compressible and durable material or mechanical device that seeks to restore its initial shape when depressed or compressed. Note that the weight and chamber may be cylindrical, in cross section, as discussed above with reference to FIG. 4A, or may have other shapes, including rectangular or hexagonal cross-sections.

Figure 11:
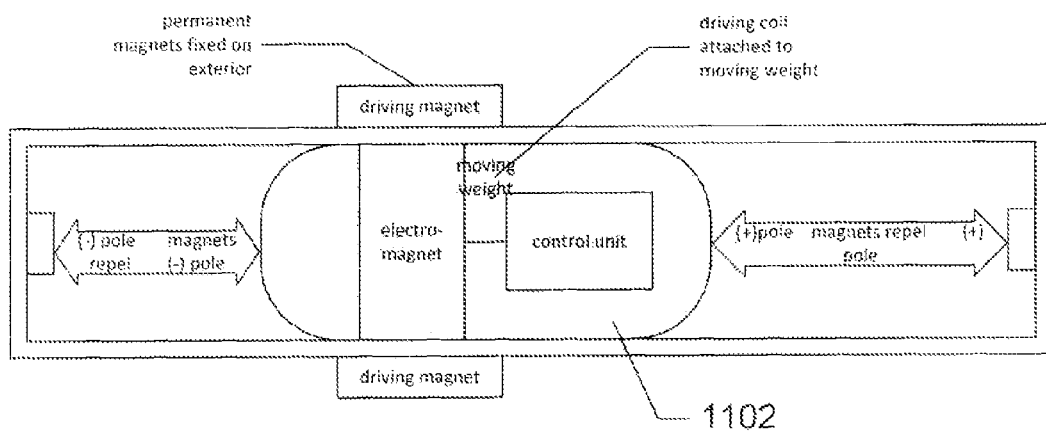

FIG. 11 shows a similar implementation in which the control unit and power supply are incorporated into the moving mass 1102. In this implementation, the relative masses of the moving mass 1102 and remaining components of the LRVM is maximized, thus maximizing the vibrational forces produced at a given level of power consumption.

Figure 12:
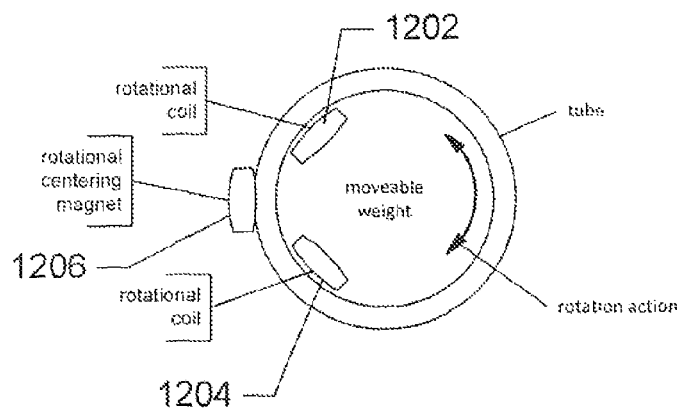

FIG. 12 shows yet an alternative LRVM embodiment of the present invention. In this alternative implementation, additional coils 1202 and 1204 are incorporated in the moving mass, and a centering magnet or coil 1206 is positioned in a fixed location on the housing so that, when the direction of the current applied to the coils 1202 and 1204 is alternated, an oscillating rotational force is generated to cause the movable weight to oscillate both in a plane perpendicular to the axis of the chamber as well as linearly oscillating the direction of the chamber.

Figure 13:
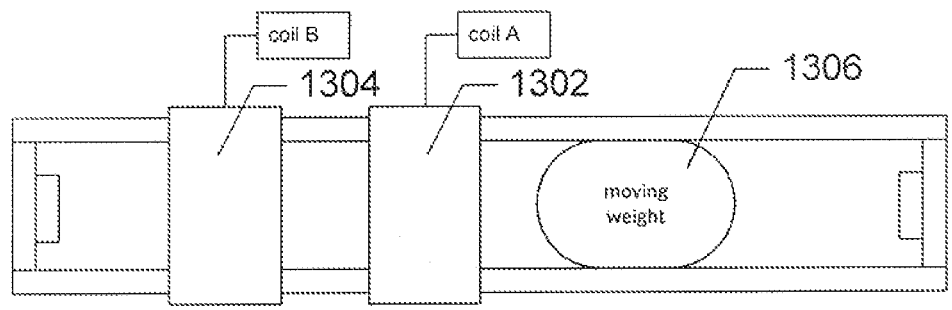

FIG. 13 illustrates an embodiment in which multiple electromagnetic coils are employed. In FIG. 13, two coils 1302 and 1304 are placed in two different positions on the housing. The first coil 1302 may be used to drive linear oscillation of the moving mass 1306, while the second coil may be activated in order to shorten the length of the chamber within which the moving mass linearly oscillates, essentially serving as a second repelling magnet. In this implementation of the LRVM, the LRVM, the moving muss may linearly oscillate with at least two different amplitudes, depending on whether or not the second coil 1304 is activated to repel the moving mass. Additionally more complex patterns of current reversal in the two coils can be employed to produce complex multi-component vibrational modes of the moving mass.

When the housing is fully enclosed, air within the chamber serves to dampen oscillation of the moving mass. This dampening may be minimized by providing channels, on the sides of the moving mass, to allow air to pass from one side of the moving mass to the other, by channels through the moving mass, or by providing openings in the housing to allow air to be forced from the housing and drawn into the housing. Additionally, different fluids or liquids may be employed within the chamber to change the dampening effect produced by displacement of the fluids and gasses as the moving mass linearly oscillates.

Figure 14:
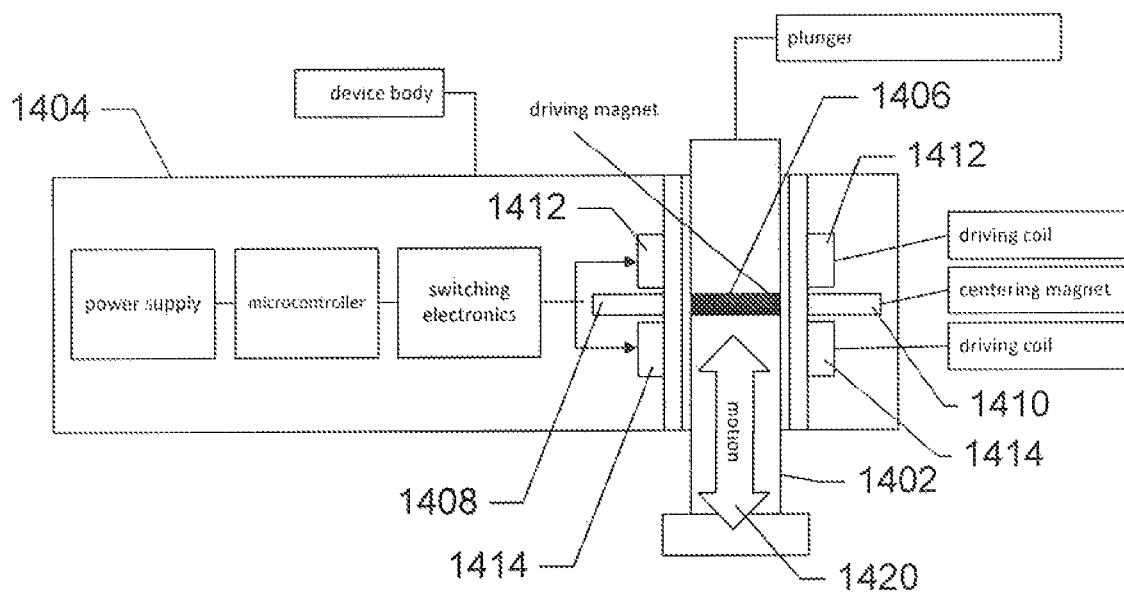

FIG. 14 illustrates an alternative LRVM embodiment of the present invention in which a plunger linearly oscillates to produce a vibration. The plunger 1402 is oriented orthogonally to a main housing 1404 of the LRVM that includes the power supply, microcontroller, and other control components. The plunger is girdled by, or includes, a driving magnet 1406 that is attracted to, and seeks to be positioned in alignment with, a centering magnet 1408 mounted within the housing. Applying current to one of two driving coils 1412 and 1414 forces the driving magnet away from the equilibrium position shown in FIG. 14. By rapidly switching the direction of current applied to the driving coils, the microcontroller can control the plunger to linearly oscillate in an up-and-down fashion, as indicated by arrow 1420.

Figure 15:
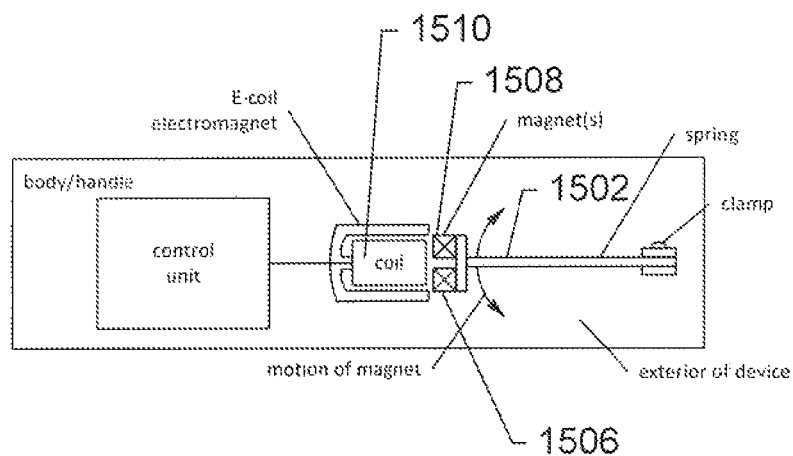

FIG. 15 shows yet another LRVM embodiment of the present invention. In this embodiment of the present invention, a spring-like member 1502 is clamped at one end 1504 to the housing. Driving magnets 1506 and 1508 are fixed to the spring-like member 1502, and when current is rapidly reversed in a coil 1510, the spring-like member 1502 is induced to vibrate at a relatively high frequency.

Figure 16:
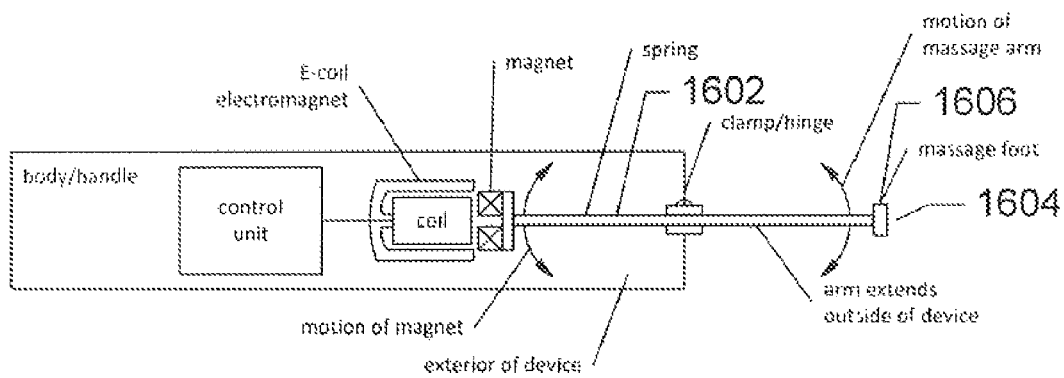

FIG. 16 shows an alternative embodiment of the present invention similar to the embodiment shown in FIG. 15. In this embodiment, the spring member 1602 is extended to provide an external massage arm 1604 that extends out from the housing to provide a linearly oscillating massage-foot member 1606 for massaging human skin or some other substrate, depending on the application.

Figure 17:
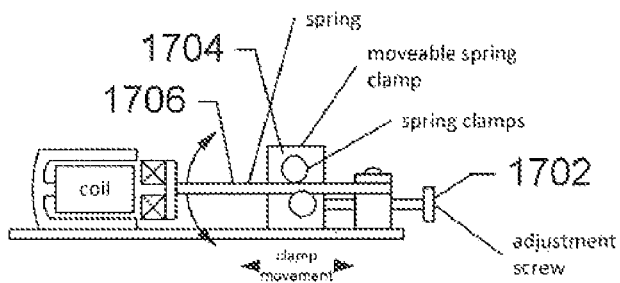

FIG. 17 shows a mechanical vibration adjustment feature that can be added to either of the embodiments shown in FIGS. 15 and 16. An adjustment screw 1702 can be manipulated to alter the position of a movable spring clamp 1704 that acts as a movable clamping point for the spring-like member 1706. Moving the movable spring clamp 1704 leftward, in FIG. 17, shortens the length of the spring-like member and thus tends to increase the resonant frequency at a particular power-consumption level. Conversely, moving the movable spring clamp rightward, in FIG. 17, lengthens the spring-like member and decreases the vibrational frequency.

Figure 18:
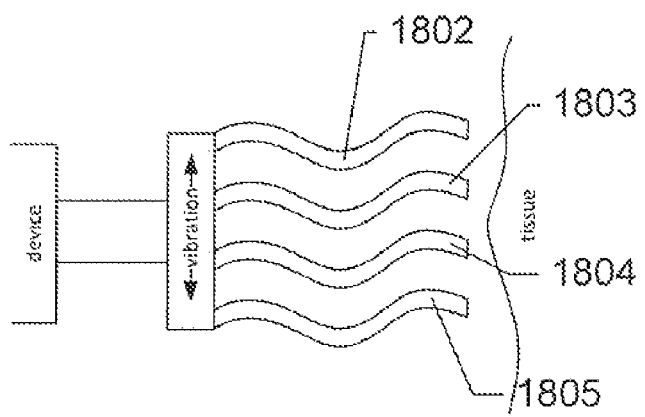
FIG. 18 illustrates an enhancement of the embodiment of the present invention shown in FIG. 16.

FIG. 18 illustrates an enhancement of the embodiment of the present invention shown in FIG. 16. In this embodiment, the massage foot is enhanced to include elastomer bristles 1802-1805 to transfer the linear oscillation of the massage foot to human skin or another substrate.

Although the present invention has been described in terms of particular embodiments, it is not intended that the invention be limited to these embodiments. Modifications will be apparent to those skilled in the art. For example, as discussed above, LRVMs can be designed to produce desired vibrational amplitudes and frequencies over a wide region of amplitude/frequency space by varying various different design parameters and characteristics, including the amplitude of a moving mass that linearly oscillates within the LRVM, altering the dimensions of the LRVM and internal components of the LRVM, altering the weight of the moving mass and other components of the LRVM, changing the ratio of the moving mass to the ratio of the remaining components of the LRVM, increasing or decreasing the number of turns in the coil or coils used to drive linear oscillation, increasing or decreasing the current supply to the coils, altering the dampening produced by displacement of fluid or gas by the moving mass within the LRVM as well as by various additional frictional forces, altering the strength of the end-cap magnets or mechanical springs used to facilitate reversal of direction of the moving mass, and by changing any of various additional parameters and characteristics. Any of various different microprocessors and other microcontrollers can be used in alternative embodiments of the LRVM, as well as different power supplies, current-switching devices, and other components. The control program executed by the LRVM can be implemented in many different ways by varying any of many different design parameters, including programming language, control structures, data structures, modular organization, and other such design parameters. The components of the LRVM, including the housing, moving mass, fixed magnets, and electromagnets, can be fashioned from many different types of materials, from polymers and plastics to metals and alloys in various composite materials. LRVMs may contain one, two, or more electromagnets and/or permanent magnets in order to produce linear oscillation of a moving mass or spring-like mass, and various different control programs can be implemented to produce many different types of single-component and multi-component vibrational modes, some of which may regularly or erratically change, over time, to produce a wide variety of different types of vibrational characteristics. An additional housing made from a material with a relatively large magnetic permeability can be added to various embodiments of the present invention to concentrate and increase the linear magnetic forces produced by the various coils.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A linear resonant vibration module comprising:
a housing;
a moveable component;
a power supply;
a driving component that drives the moveable component in each of two opposite directions; and
a control component that includes a microprocessor and that controls supply of power from the power supply to the driving component to cause the moveable component to linearly oscillate, the control component including, in addition to the microprocessor,
  a control program, stored in one of a separated electronic memory or within the processor, that is executed by the microprocessor to control operation of the linear resonant vibration module, and
  a switch that receives a directional signal d from the processor and that selects a corresponding direction of the two opposite directions in which the driving component drives the moveable component,
the control component receiving output signals from sensors within the linear resonant vibration module during operation of the linear resonant vibration module and adjusting one or more operational control outputs of the control component according to the received output signals from the sensors in order that subsequent operation of linear resonant vibration module produces desired outputs from the one or more sensors corresponding to one or more operational control parameters.

2. The linear resonant vibration module of claim 1 wherein the switch comprises:
a directional-signal d input;
a voltage input;
a directional-signal splitter/inverter that generates two complementary internal signals, d and $\bar{d}$, corresponding to directional-signal d; and
two pairs of solid-state switches, a first switch of each pair controlled by internal signal d and a second switch of the pair controlled by internal signal $\bar{d}$, that apply the input voltage in a first direction to the driving component when the d is in a first voltage state and that apply the input voltage in a second direction to the driving component when the d is in a second voltage state.

3. The linear resonant vibration module of claim 2 wherein the linear resonant vibration module further includes a vibration sensor; and
wherein the control program continuously monitors output from the vibration sensor in order to adjust the frequency at which the control program changes the voltage state of the directional signal d.

4. The linear resonant vibration module of claim 2 wherein the control program receives user input from one or more input features, including one or more of buttons, dials, switches, and other user-input features.

5. The linear resonant vibration module of claim 4 wherein, when the control program receives user input directing a change in vibration strength, the control program changes the current provided from a power supply to the driving component; and
wherein, when the control program receives user input directing a change in vibration frequency, the control program changes the frequency at which the control program changes the voltage state of the directional signal d.

* * * * *